United States Patent
Lei et al.

(10) Patent No.: US 12,484,486 B1
(45) Date of Patent: Dec. 2, 2025

(54) PLANT GROWTH LIGHT AND PLANT GROWING SHED

(71) Applicant: Shenzhen Guanke Technologies Co., Ltd, Shenzhen (CN)

(72) Inventors: Bo Lei, Shenzhen (CN); Qing Lan, Shenzhen (CN); Yu Lei, Shenzhen (CN); Haiying Wu, Shenzhen (CN)

(73) Assignee: Shenzhen Guanke Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/966,315

(22) Filed: Dec. 3, 2024

(30) Foreign Application Priority Data

Aug. 15, 2024 (CN) .......................... 202421973440.0

(51) Int. Cl.
| | |
|---|---|
| *A01G 7/04* | (2006.01) |
| *A01G 9/24* | (2006.01) |
| *F21V 29/67* | (2015.01) |
| *F21V 29/83* | (2015.01) |
| *F21Y 103/00* | (2016.01) |

(52) U.S. Cl.
CPC ............... *A01G 7/045* (2013.01); *A01G 9/24* (2013.01); *F21V 29/677* (2015.01); *F21V 29/83* (2015.01); *F21Y 2103/00* (2013.01)

(58) Field of Classification Search
CPC .......... A01G 9/246; A01G 7/04; Y02P 60/14; F21V 29/61; F21V 29/67; F21V 29/83; F21Y 115/10; F21Y 103/00
See application file for complete search history.

(56) References Cited

U.S. PATENT DOCUMENTS

| | | | | |
|---|---|---|---|---|
| 9,523,489 | B1 * | 12/2016 | Harms | ................... A01G 7/045 |
| 12,041,894 | B2 * | 7/2024 | Van Vliet | .............. F21V 29/673 |
| 2015/0116997 | A1 * | 4/2015 | Tappert | .................. A01G 7/045 |
| | | | | 362/249.03 |

* cited by examiner

*Primary Examiner* — William J Carter
(74) *Attorney, Agent, or Firm* — Maier & Maier, PLLC

(57) ABSTRACT

A plant growth light and a plant growing shed, the plant growth light including a housing enclosing a chamber having an opening at least at one end; a heat dissipation member disposed within the housing and dividing the chamber into at least a heat dissipation member channel and a lighting channel; a light board disposed in the lighting channel and being thermally connected to the heat dissipation member; a fan disposed close to the opening and forcing an airflow to accelerate. The housing illuminated by the light board is translucent to enable light to irradiate plants to be supplemented with light located outside the housing, and the housing is provided with a plurality of air outlet holes spaced in an extension direction of the heat dissipation channel to enable the accelerated airflow to be blown to plants to be ventilated located outside the housing.

16 Claims, 5 Drawing Sheets

PLANT GROWTH LIGHT AND PLANT GROWING SHED

CROSS-REFERENCE TO RELATED APPLICATIONS

This application claims the priority of Chinese Patent Application No. 202421973440.0, entitled "PLANT GROWTH LIGHT AND PLANT GROWING SHED", filed with the China National Intellectual Property Administration on Aug. 15, 2024, which is incorporated herein by reference in its entirety.

TECHNICAL FIELD

The present application relates to the technical field of plant lighting luminaries, in particular to a plant growth light and a plant growing shed.

BACKGROUND

Sunlight is essential in the process of plant growth. To accelerate plant growth, supplemental lighting, such as plant growth lights, can be used at night to provide additional light to the plants' environment, thus meeting the growth requirements of the plants.

Indoor cultivation setups like plant growing frames and plant growing sheds are common in North America, where plants need both a lighting system that simulates sunlight and a ventilation system to circulate air during their growth cycle.

Current ventilation systems, which include fans and ducts arranged around the plants, are bulky. To provide space for accommodating these ventilation systems, the size of the plant frames has to be increased, inadvertently raising the cost of indoor cultivation. Furthermore, the installation of air ducts adds to the workload.

Therefore, it is an urgent technical issue to design a lighting system and a ventilation system that reduces both the size and the installation space required.

SUMMARY

A main purpose of the present application is to provide a plant growth light, aiming at solving the technical problems of the ventilation system of the planting frame in the prior art being excessively large, requiring a significant installation space, and increasing costs.

In order to achieve the above purpose, the present application provides a plant growth light, comprising:
  a housing, enclosing to form a chamber with an opening at least at one end;
  a heat dissipation member, provided in the housing and dividing the chamber into at least a heat dissipation channel and a lighting channel;
  a light board, positioned close to the heat dissipation component in the lighting channel, and thermally connected to the heat dissipation component; and
  a fan, provided close to the opening and forcing an airflow from the opening into the heat dissipation channel to accelerate;
  wherein at least a portion of the housing illuminated by the light board is translucent to enable light to pass through the translucent portion to plants to be supplemented with light located outside the housing; and
  the housing is provided with a plurality of air outlet holes spaced in an extension direction of the heat dissipation channel to enable the accelerated airflow to be blown from the air outlet holes to plants to be ventilated located outside the housing.

In the technical solution of the present application, the plant growth light divides the chamber of the housing into a heat dissipation channel and a lighting channel by means of a heat dissipation member. An opening is formed at one end of the housing, a fan is provided close to the opening, and a plurality of air outlet holes are spaced apart along the extension direction of the heat dissipation channel of the housing, so that accelerated airflow from the outside by the fan is blown through the plurality of air outlet holes on the housing to the plants located outside the housing to provide ventilation for plant growth. A light board is provided in the lighting channel and illuminates the plants outside the housing to provide lighting conditions for plant growth. Through the fan and a number of air outlet holes opened along the heat dissipation channel on the housing, the lighting and ventilation for the plants are integrated together, greatly saving the installation space of the plant growing frame, and the air blown from the air outlet holes can also take away the heat generated by the light board, so that the plant growth light has a better heat dissipation effect.

The present application also provides a plant growing shed, comprising the above-described plant growth light, wherein at least the fan is provided outside the growing shed to enable air from outside the plant growing shed to be accelerated by the fan and blown from the chamber through the air outlet holes to plants located inside the plant growing shed to be ventilated.

The above description is only an overview of the technical solution of the present application, and in order to be able to more clearly understand the technical means of the present application, which may be implemented in accordance with the contents of the specification, and in order to make the above and other purposes, features and advantages of the present application more obvious and easy to understand, the following specific embodiments of the present application are particularly cited.

BRIEF DESCRIPTION OF THE DRAWINGS

Various other advantages and benefits will become clear to those of ordinary skill in the art by reading the detailed description of the preferred embodiments below. The accompanying drawings are used solely for the purpose of illustrating the preferred embodiments and are not considered to be a limitation of the present application. Moreover, throughout the accompanying drawings, the same reference signs are used to denote the same components.

DETAILED DESCRIPTION OF THE EMBODIMENTS

The following embodiments of the technical solution of the present application will be described in detail in conjunction with the accompanying drawings. The following embodiments are only used to illustrate the technical solution of the present application more clearly, and thus are only used as examples and not to limit the scope of protection of the present application.

Figure 4:
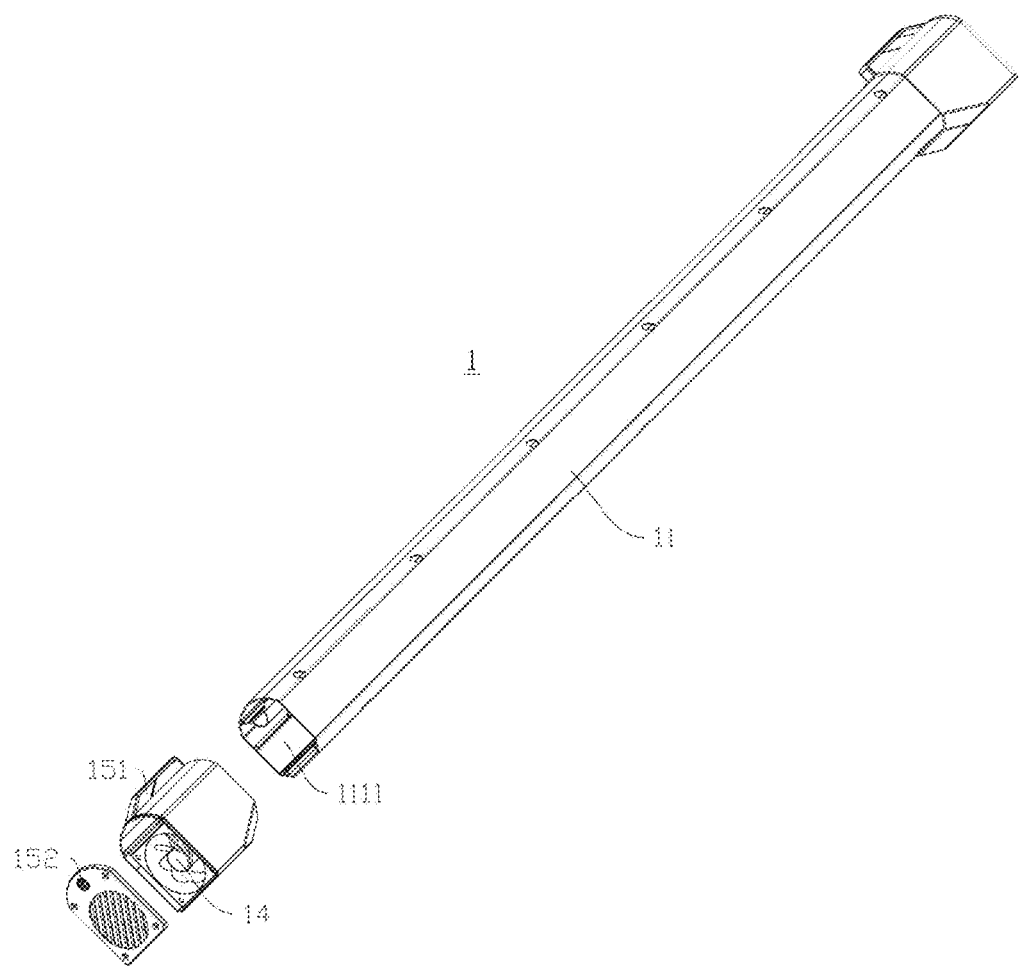
FIG. 4 illustrates a partially exploded view of the plant growth light according to an embodiment of the present application.
Figure 5:
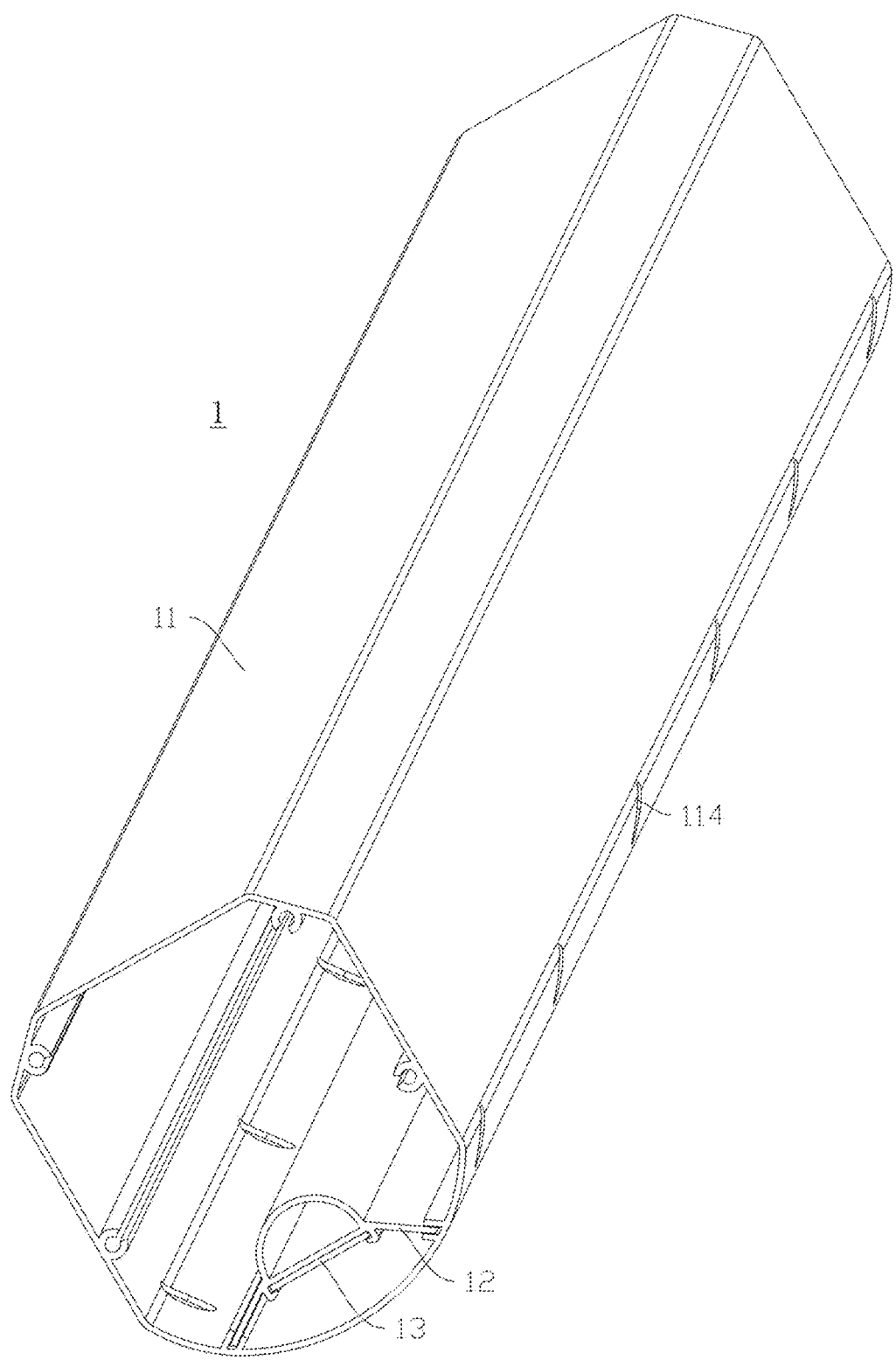
FIG. 5 illustrates a three-dimensional view of a housing, a heat dissipation member and a light board according to an embodiment of the present application.
Figure 6:
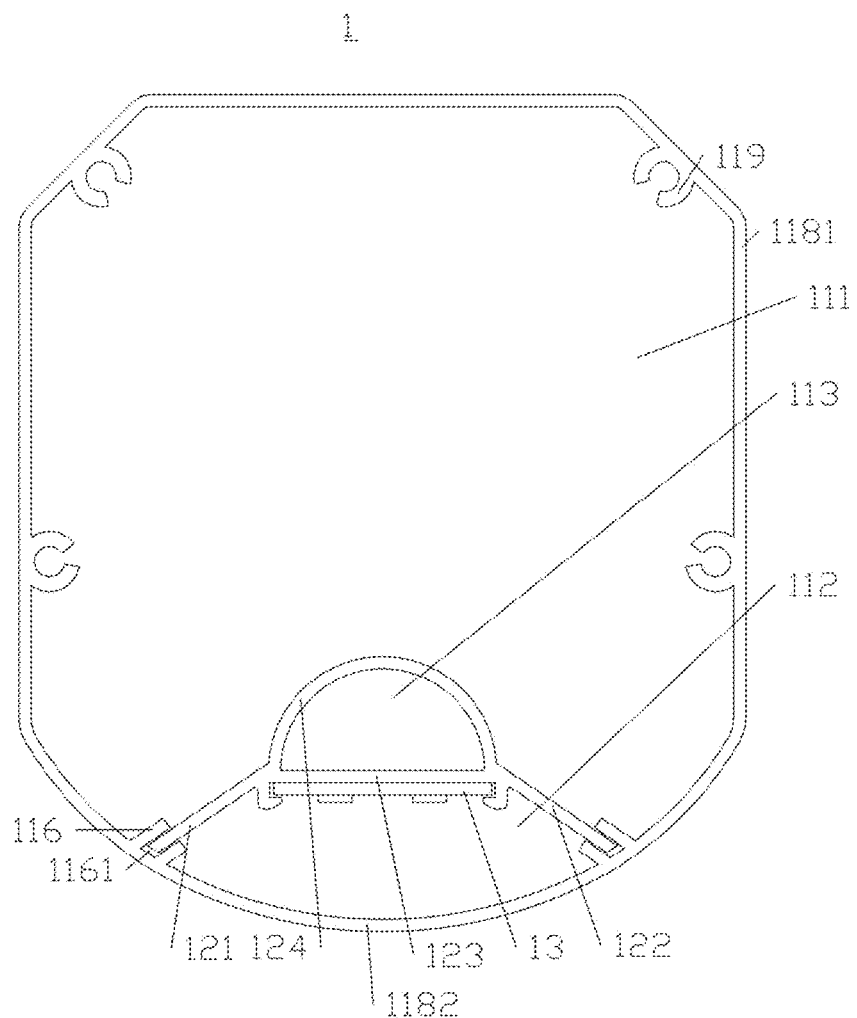
FIG. 6 illustrates a sectional view of the plant growth light in a radial direction according to an embodiment of the present application.

Referring to FIGS. 4, 5, and 6, the plant growth light 1 provided by an embodiment of the present application includes a housing 11, enclosing to form a chamber with an opening 1111 at least at one end; a heat dissipation member 12, provided in the housing 11 and dividing the chamber into at least a heat dissipation channel 111 and a lighting channel 112; a light board 13, positioned in the lighting channel 112, and close to the heat dissipation member 12 and thermally connected to the heat dissipation member 12; and a fan 14, provided close to the opening 1111 and forcing an airflow from the opening 1111 into the heat dissipation channel 111 to accelerate. At least a portion of the housing 11 illuminated by the light board 13 is translucent to enable light to pass through the translucent portion to plants to be supplemented with light located outside the housing 11. The housing 11 is provided with a plurality of air outlet holes 114 spaced in an extension direction of the heat dissipation channel 111 to enable the accelerated airflow to be blown from the air outlet holes to plants to be ventilated located outside the housing 11.

The plant growth light 1 divides the chamber of the housing 11 into a heat dissipation channel 111 and a lighting channel 112 by means of a heat dissipation member 12. An opening 1111 is formed at one end of the housing 11, a fan 14 is provided close to the opening 1111, and a plurality of air outlet holes 114 are spaced apart along the extension direction of the heat dissipation channel 111 of the housing 11, so that accelerated airflow from the outside by the fan 14 is blown through the plurality of air outlet holes 114 on the housing 11 to the plants located outside the housing 11 to provide ventilation for plant growth. A light board 13 is provided in the lighting channel 112 and illuminates the plants outside the housing 11 to provide lighting conditions for plant growth. Through the fan 14 and a number of air outlet holes 114 opened along the heat dissipation channel 111 on the housing 11, the lighting and ventilation for the plants are integrated together, greatly saving the installation space of the plant growing frame, and the air blown from the air outlet holes 114 can also take away the heat generated by the light board 13, so that the plant growth light 1 has a better heat dissipation effect.

In this embodiment, the plant growth light 1 is in the form of an elongated strip, and a plurality of air outlet holes 114 are arranged on both sides of the housing 11 along the lengthwise direction of the housing 11. When the plant growth light 1 is applied to a plant growing frame, both sides of the plant growth light 1 are planted with plants, such as vegetables, fruits, medicinal herbs, flower plants, and the like. The plant growth light 1 may be set between two rows of the plants, and its air outlet holes 114 arranged in the lengthwise direction can blow air to more plants in the two rows. Besides, the light board 13 emits light from the light-transmitting portion of the housing 11 toward the two rows of plants to provide illumination and light supplement conditions.

Preferably, as shown in FIGS. 5 and 6, the inner wall of the housing 11 is provided with protruding ribs 116 towards the chamber, and a fastening groove 1161 is formed in a center of each rib 116. Two ends of the heat dissipation member 12 are respectively snapped to the plurality of fastening grooves 1161 to divide the chamber into the heat dissipation channel 111 and the lighting channel 112.

In the elongated plant growth light 1, the ribs with the fastening grooves and the housing 11 are of a one-piece construction, and the ribs extend from one end portion of the housing 11 to the other end portion along a lengthwise direction. The two fastening grooves 1161 may be directly opposite each other, and the extension lines of the two fastening grooves 1161 are in a plane with an angle of 0°. The extension lines of the two fastening grooves 1161 may also have an angle.

It is also possible to replace the ribs 116 with a set of bumps lined up in a straight line, which can save part of the housing material while realizing the snap-in mounting of the heat dissipation member 12.

Preferably, as shown in FIG. 6, the housing 11 includes a housing body 1181 and a light-transmitting cover 1182 that are connected to each other to form the chamber.

The housing body 1181 and the light-transmitting cover 1182 on the housing 11 are demarcated by the plurality of ribs 116. A part of the housing 11 that forms the heat dissipation channel 111 is the housing body 1181, and a part of the housing 11 that forms the lighting channel 112 is the light-transmitting cover 1182.

Preferably, the light-transmitting cover 1182 is made of translucent material, such as a lightweight and good light-transmitting material including glass, polymethylmethacrylate, and polycarbonate (PC), in order to ensure that the plant growth light 1 illuminates the plant. The housing body 1181 includes a light-shielding material to avoid causing light pollution, such as a metal material or a plastic material with good heat-dissipating properties including aluminum, magnesium, or stainless steel.

In an optional embodiment, the housing body 1181 is made of transparent plastic material for spraying.

In another embodiment, the housing body 1181 and the heat-dissipating member 12 are aluminum profiles of a one-piece structure. The PC light-transmitting cover 1182 is snap-fit to the housing body 1181 to enclose the light board 13 within the lighting channel 112.

Preferably, as shown in FIGS. 5 and 6, the housing 11 is an elongated PC housing 11 to save the production cost of the housing 11. The plurality of air outlet holes 114 are arranged at intervals along the lengthwise direction of the housing 11 to achieve uniform heat dissipation in the heat dissipation channel 111 and to improve the heat dissipation efficiency of the heat dissipation channel 111. The reinforcing rib 119 protrudes from the housing 11 toward the chamber, which extends along the lengthwise direction of the housing 11 from an end face to another end face to improve the rigidity and strength of the housing 11.

Preferably, the heat dissipation member 12 is made of aluminum profiles to improve the transfer efficiency of heat from the light board 13 to the heat dissipation member 12, thereby improving the heat dissipation efficiency of the plant growth light 1.

Preferably, as shown in FIGS. 5 and 6, the heat dissipation member 12 includes a first extension plate 121 and a second extension plate 122, which extend respectively to snap-fit into the two fastening grooves, and a connecting plate 123 thermally connected to the light board 13. On one side of the light board 13, an angle between the first extension plate 121 and the connecting plate 123 is an obtuse angle, and an angle between the second extension plate 122 and the connecting plate 123 is an obtuse angle.

By fixing the light board 13 to the connecting plate 123, and setting the angle between the first extension plate 121 and the connecting plate 123 to be an obtuse angle, and the angle between the second extension plate 122 and the connecting plate 123 to be an obtuse angle, it is possible to make the light board 13 have a larger light output area. The heat is transferred to the connecting plate 123 through the light board 13, and then the heat is transferred by the connecting plate 123 to the air of the heat dissipation channel 111, so that the light board 13 achieve a large light output area while maintaining efficient heat dissipation efficiency.

The light board 13 is provided with a plurality of LED light beads, and the light beads thereof may be selected to have light wavelengths of about 400-700 nm, so as to provide effective light radiation for the photosynthesis of the plants.

Preferably, the light board 13 may be bonded or magnetically affixed to the connecting plate 123 to reduce the assembly difficulty of fixing the light board 13 to the heat dissipation member 12, and the direct contact between the light board 13 and the heat dissipation member 12 improves the heat dissipation efficiency.

Preferably, as shown in FIG. 6, the heat dissipation member 12 further includes an arch plate 124. The heat dissipation member 12 has a first surface and a second surface, and the light board 13 is attached to the first surface. The arch plate 124 is attached to the second surface on both sides and forms an accommodating channel 113 with the second surface. The light board 13 is electrically connected to an external power source through a cable, and the cable is arranged in the accommodating channel 113.

The accommodating channel 113 is formed by the connecting plate 123 and the arch plate 124 of the heat dissipation component 12, and the cable of the light board 13 is placed within the accommodating channel 113. This setup keeps the wiring arrangement within the plant growth light 1 clear, facilitating maintenance when any issues arise with the plant growth light in the future.

The plant growth light 1 provided by the embodiments of the present application divides the chamber of the housing 11 into the heat dissipation channel 111 and the lighting channel 112 by the heat dissipation member 12, which can improve the utilization of the internal space of the housing 11 and is conducive to reducing the volume of the plant growth light 1.

In the embodiment of the present application, the light board 13 is fixed to the connecting plate 123 of the heat-dissipating member 12, so that under power-on conditions, the light emitted by the light board 13 can be irradiated through the light-transmitting portion of the housing 11 to the plants located outside the housing 11 to be supplemented with light, so as to realize supplementing the light to the environment in which the plants are located and to meet the growth needs of the plants. Moreover, the heat from the light board 13 when lighting is transferred to the heat-dissipating member 12, and then, the heat of the heat dissipation member 12 is transferred to the air in the heat dissipation channel 111. By setting the fan 14 close to the opening 1111 and a plurality of air outlet holes 114 on the housing 11, the fan 14 under power-on conditions can blow the air in the heat dissipation channel 111 of the housing 11 to move through the plurality of air outlet holes 114 toward the outside of the housing 11, so as to transfer the heat to the outside of the housing 11, thereby realizing ventilation and heat dissipation, so that the plant growth light 1 has a good heat dissipation function.

Figure 1:
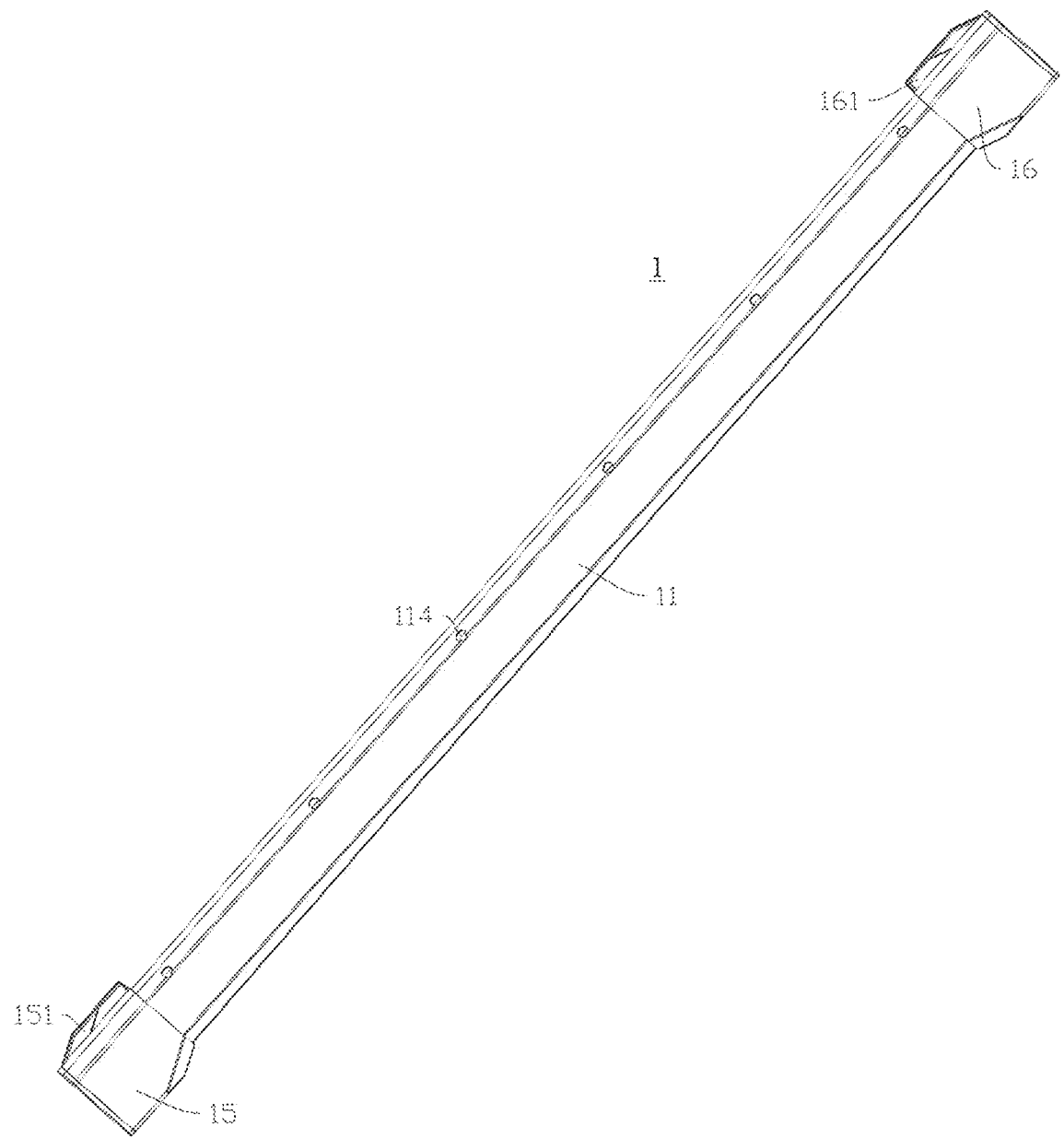
FIG. 1 illustrates a front view of a plant growth light according to an embodiment of the present application.
Figure 2:
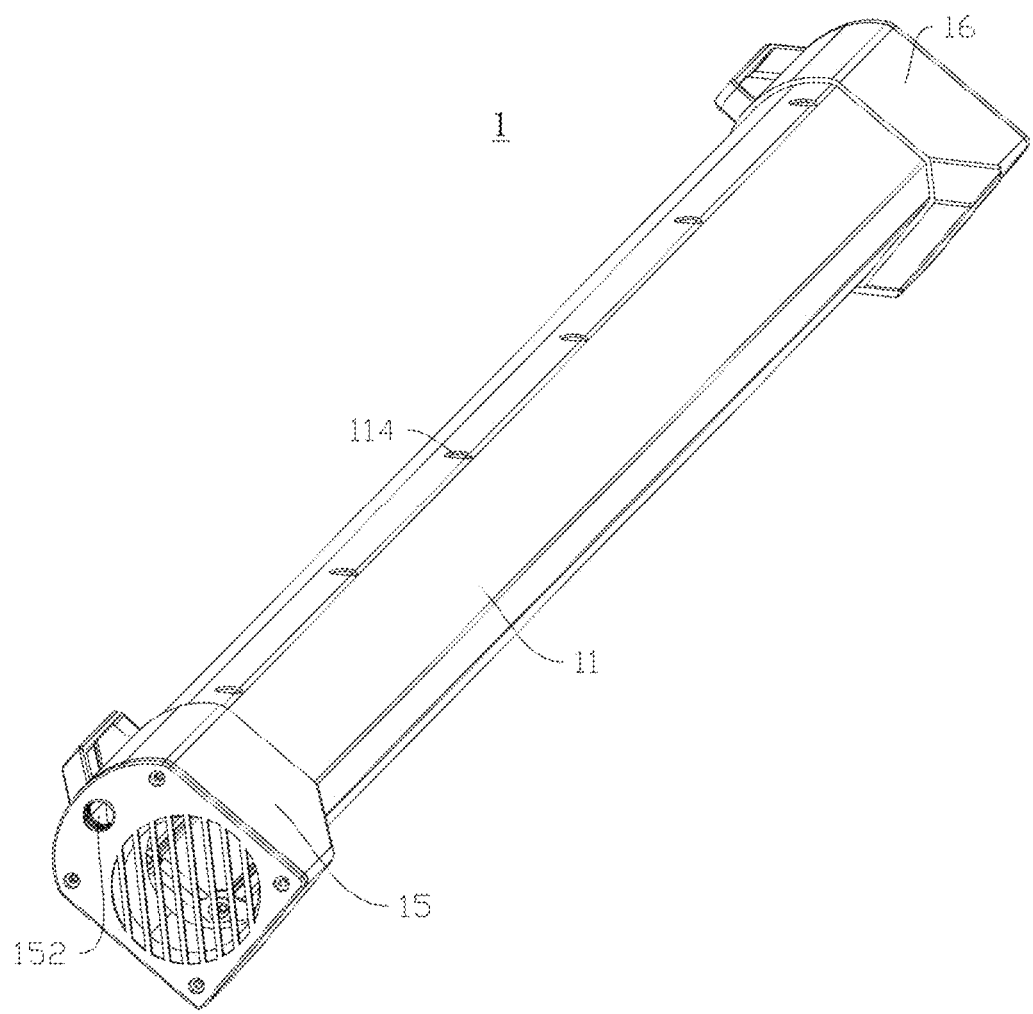
FIG. 2 illustrates a three-dimensional view of the plant growth light according to an embodiment of the present application.
Figure 3:
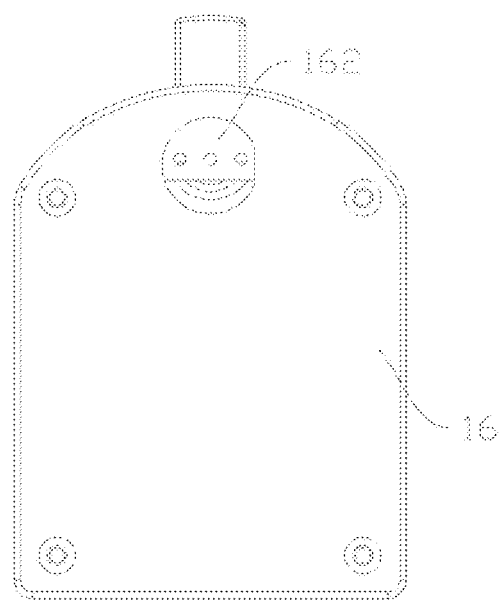
FIG. 3 illustrates a left view of the plant growth light in FIG. 1 according to an embodiment of the present application.

Preferably, as shown in FIGS. 1, 2, and 4, the plant growth light 1 further includes two end caps (a first end cap 15 and a second end cap 16 as shown in FIG. 1) to prevent plant dust from entering into the chamber of the housing 11. At least one of the end caps is in communication with the chamber and the fan 14 is provided therein. As shown in FIG. 4, the fan 14 is provided within the first end cap 15 and the first end cap 15 is in communication with the chamber through the opening 1111.

Preferably, as shown in FIGS. 1, 2, 3, and 4, the first end cap 15 is provided with a first lug 151 in an irradiation direction of the light board 13, and the second end cap 16 is provided with a second lug 161 in an irradiation direction of the light board 13, so that the light board 13 is irradiated upwardly when lifting the plant growth light 1 in order to improve the applicability of the plant growth light 1. The first end cap 15 and the second end cap 16 are provided with a connectable first electrical interface 152 and a second electrical interface 162, respectively, for electrically connecting to an external power source.

According to another aspect of the embodiments of the present application, there is also provided a plant growing shed including the plant growth light 1 as described in any of the above embodiments, in which the fan 14 is provided outside the plant growing shed to enable air outside the plant growing shed to be accelerated by the fan 14 and blown from the chamber through the plurality of air outlet holes 114 to the plants located inside plant growing shed to be ventilated.

What is claimed is:

1. A plant growth light, comprising:
a housing enclosed to form a chamber with an opening at least at one end; at least two opposing ribs protruding from an inner wall of the housing towards the chamber, and a middle portion of each of the ribs is formed with a fastening groove;
a heat dissipation member provided in the housing and opposite ends of the heat-dissipation member are snapped onto two fastening grooves, respectively, to divide the chamber into at least a heat dissipation channel and a lighting channel;
a light board positioned close to the heat dissipation member in the lighting channel, and thermally connected to the heat dissipation member; and
a fan provided close to the opening and forcing an airflow from the opening into the heat dissipation channel to accelerate;
wherein at least a portion of the housing illuminated by the light board is translucent to enable light to pass through the translucent portion to plants to be supplemented with light located outside the housing; and
the housing is provided with a plurality of air outlet holes spaced in an extension direction of the heat dissipation channel to enable the accelerated airflow to be blown from the air outlet holes to plants to be ventilated located outside the housing.

2. The plant growth light of claim 1, wherein the heat-dissipating member comprises a first extension plate and a second extension plate, which extend respectively to snap-fit into the two fastening grooves, and a connecting plate thermally connected to the light board; and on one side of the light board, an angle between the first extension plate and the connecting plate is an obtuse angle, and an angle between the second extension plate and the connecting plate is an obtuse angle.

3. The plant growth light of claim 2, wherein the heat-dissipating member further comprises an arch plate; and the heat-dissipating member is provided with a first surface and a second surface, wherein the light board is affixed to the first surface, and the arch plate is connected to the second surface on both sides and forms an accommodating channel with the second surface; the light board is electrically connected to an external power source through a cable, and the cable is arranged within the accommodating channel.

4. The plant growth light of claim 1, wherein the housing comprises a housing body and a light-transmitting cover, which are connected to each other to form the chamber.

5. The plant growth light of claim 4, wherein the housing body and the heat dissipation member are of a one-piece structure, and the light-transmitting cover is snap-fitted to the housing body.

6. The plant growth light of claim 4, wherein the housing is an elongated polycarbonate (PC) housing; the air outlet holes are spaced at least along a lengthwise direction of the housing, and a reinforcing rib protrudes from the housing toward the chamber, which extends from one end face to the other end face along the lengthwise direction of the housing.

7. The plant growth light of claim 1, further comprising two end caps, wherein at least one of the end caps is in communication with the chamber, and the fan is provided in the end cap in communication with the chamber.

8. The plant growth light of claim 7, wherein the two end caps are provided with lugs in an irradiation direction of the light board, and the light board is irradiated upwardly when the plant growth light is lifted; and each of the two end caps is provided with a connectable electrical interface.

9. A plant growing shed, comprising:
a plant growth light, including:
a housing enclosed to form a chamber with an opening at least at one end; at least two opposing ribs protruding from an inner wall of the housing towards the chamber, and a middle portion of each of the ribs is formed with a fastening groove;
a heat dissipation member provided in the housing and opposite ends of the heat-dissipation member are snapped onto two fastening grooves, respectively, to divide the chamber into at least a heat dissipation channel and a lighting channel;
a light board positioned close to the heat dissipation member in the lighting channel, and thermally connected to the heat dissipation member; and
a fan provided close to the opening and forcing an airflow from the opening into the heat dissipation channel to accelerate;
wherein at least a portion of the housing illuminated by the light board is translucent to enable light to pass through the translucent portion to plants to be supplemented with light located outside the housing;
the housing is provided with a plurality of air outlet holes spaced in an extension direction of the heat dissipation channel to enable the accelerated airflow to be blown from the air outlet holes to plants to be ventilated located outside the housing; and
wherein at least the fan is provided outside the plant growing shed to enable air from outside the plant growing shed to be accelerated by the fan and blown from the chamber through the air outlet holes to plants located inside the plant growing shed to be ventilated.

10. The plant growing shed of claim 9, wherein the heat-dissipating member comprises a first extension plate and a second extension plate, which extend respectively to snap-fit into the two fastening grooves, and a connecting plate thermally connected to the light board; and on one side of the light board, an angle between the first extension plate and the connecting plate is an obtuse angle, and an angle between the second extension plate and the connecting plate is an obtuse angle.

11. The plant growing shed of claim 10, wherein the heat-dissipating member further comprises an arch plate; and the heat-dissipating member is provided with a first surface and a second surface, wherein the light board is affixed to the first surface, and the arch plate is connected to the second surface on both sides and forms an accommodating channel with the second surface; the light board is electrically connected to an external power source through a cable, and the cable is arranged within the accommodating channel.

12. The plant growing shed of claim 9, wherein the housing comprises a housing body and a light-transmitting cover, which are connected to each other to form the chamber.

13. The plant growing shed of claim 12, wherein the housing body and the heat dissipation member are of a one-piece structure, and the light-transmitting cover is snap-fitted to the housing body.

14. The plant growing shed of claim 12, wherein the housing is an elongate PC housing; and the air outlet holes are spaced at least along a lengthwise direction of the housing, and a reinforcing rib protrudes from the housing towards the chamber, which extends from one end face to the other end face along the lengthwise direction of the housing.

15. The plant growing shed of claim 9, wherein the plant growth light further comprises two end caps, wherein at least one of the end caps is in communication with the chamber and the fan is provided in the end cap in communication with the chamber.

16. The plant growing shed of claim 15, wherein the two end caps are provided with lugs in an irradiation direction of the light board, and the light board is irradiated upwardly when the plant growth light is lifted; and each of the two end caps is provided with a connectable electrical interface.

* * * * *